(12) United States Patent
Padilla et al.

(10) Patent No.: US 9,767,328 B2
(45) Date of Patent: Sep. 19, 2017

(54) AUTONOMOUS TUNING METHOD TO IMPROVE RADIO FREQUENCY PERFORMANCE

(71) Applicant: Assa Abloy AB, Stockholm (SE)

(72) Inventors: Toby Mark Padilla, Lakewood, CO (US); Ryan Milbrandt, Lakewood, CO (US); Bryan Stephen Holloway, Edgewater, CO (US); Geoffrey Edwards, Brighton, CO (US)

(73) Assignee: ASSA ABLOY AB (SE)

( * ) Notice: Subject to any disclaimer, the term of this patent is extended or adjusted under 35 U.S.C. 154(b) by 374 days.

(21) Appl. No.: 14/212,846

(22) Filed: Mar. 14, 2014

(65) Prior Publication Data
US 2014/0266627 A1    Sep. 18, 2014

Related U.S. Application Data

(60) Provisional application No. 61/794,352, filed on Mar. 15, 2013.

(51) Int. Cl.
*H04Q 5/22* (2006.01)
*G06K 7/00* (2006.01)
*G06K 7/10* (2006.01)

(52) U.S. Cl.
CPC ....... *G06K 7/0008* (2013.01); *G06K 7/10138* (2013.01); *G06K 7/10148* (2013.01); *G06K 7/10198* (2013.01)

(58) Field of Classification Search
CPC .......................... G06K 7/0008; G06K 7/10198
See application file for complete search history.

(56) References Cited

U.S. PATENT DOCUMENTS

| 6,650,227 | B1 | 11/2003 | Bradin |
| 7,439,860 | B2 | 10/2008 | Andresky |
| 2007/0222605 | A1* | 9/2007 | Andresky .......... G06K 7/10316 340/572.7 |

(Continued)

FOREIGN PATENT DOCUMENTS

| EP | 1605391 | 12/2005 |
| EP | 1840790 | 10/2007 |

(Continued)

OTHER PUBLICATIONS

Extended Search Report for European Patent Application No. 14159697.3, dated Oct. 23, 2014 15 pages.

(Continued)

*Primary Examiner* — Omeed Alizada
(74) *Attorney, Agent, or Firm* — Sheridan Ross P.C.

(57) ABSTRACT

Methods and systems are provided for an RFID system that can be tuned dynamically and/or in real-time during a coupling event between a reader and a transponder. The reader can comprise an antenna assembly, a signal driver, and a controller. The antenna assembly may include a tuning circuit and an antenna coupled to the tuning circuit. The tuning circuit can include registers that may be set to adjust one or more characteristics of the reader. A controller is coupled to the antenna assembly to determine characteristics of the received signal and to set hardware or firmware functions that improve the coupling of the reader and transponder and/or improve the reception of the signal(s) from the transponder.

20 Claims, 8 Drawing Sheets

(56) References Cited

U.S. PATENT DOCUMENTS

2008/0290995 A1* 11/2008 Bruns ................. G06K 7/0008
340/10.1
2009/0102663 A1* 4/2009 Hillegass ............. G06K 7/0008
340/572.5

FOREIGN PATENT DOCUMENTS

EP          2009573      12/2008
WO     WO 01/50407       7/2001
WO     WO 2004/004196    1/2004

OTHER PUBLICATIONS

Partial Search Report for European Patent Application No. 14159697.3, dated Jun. 30, 2014 7 pages.

* cited by examiner

AUTONOMOUS TUNING METHOD TO IMPROVE RADIO FREQUENCY PERFORMANCE

CROSS REFERENCE TO RELATED APPLICATION

This application claims priority, under 35 U.S.C. §119, to U.S. Provisional Application No. 61/794,352, entitled "AUTONOMOUS TUNING METHOD TO IMPROVE RF PERFORMANCE," filed Mar. 15, 2013, which is incorporated by reference in its entirety for all that it teaches and for all purposes.

FIELD OF THE DISCLOSURE

The present disclosure is generally directed toward reading credentials. More particularly, the present disclosure relates generally to auto-tuning or auto-adjusting a reader.

BACKGROUND

Radio frequency identification (RFID) systems typically include at least one reader and a plurality of transponders, which are commonly termed credentials, cards, tags, or the like. The transponder may be an active or passive radio frequency communication device, which is directly attached to or embedded in an article to be identified or otherwise characterized by the reader. Alternatively, the transponder may be embedded in a portable substrate, such as a card or tag, carried by a person or an article to be identified or otherwise characterized by the reader. An active transponder is powered up by its own internal power supply, such as a battery, which provides the operating power for the transponder circuitry. In contrast, a passive transponder is characterized as being dependent on the reader for its power. The reader "excites" or powers up the passive transponder by transmitting excitation signals of a given frequency into the space surrounding the reader, which are received by the transponder and provide the operating power for the circuitry of the recipient transponder.

Communication between the reader and transponder is enabled by cooperative resonant circuits which are provided in each reader and transponder. The resonant circuit of a reader includes an inductor, typically in the form of an antenna, which magnetically couples to the inductor in the resonant circuit of a compatible transponder through mutual inductance. The resonant circuit of the transponder correspondingly includes an inductor which magnetically couples to the inductor in the resonant circuit of the reader through mutual inductance.

Communication is initiated when a transponder is proximally positioned relative to the reader. The reader has a power supply which conveys a current to the reader resonant circuit causing the reader antenna to produce an excitation signal in the form of an electromagnetic field. The excitation signal couples to the antenna of the proximally-positioned transponder through mutual inductance and the excitation signal powers and clocks the transponder circuitry initiating operation of the transponder.

Transponder operation comprises generation of a response signal at a specified frequency and transmission of the transponder response signal back to the reader. In particular, the transponder resonant circuit receives a current in response to the excitation signal, which causes the transponder antenna to produce a response signal in the form of an electromagnetic field. The response signal couples to the reader antenna through mutual inductance in substantially the same manner as described above with respect to coupling of the excitation signal to the transponder antenna.

The transponder typically employs frequency or amplitude modulation of the response signal to encode data stored in the memory of the transponder circuitry into the response signal. When the response signal couples to the reader antenna, a corresponding current is induced in the reader antenna at the specified frequency. The reader processes the induced current to read the data encoded in the response signal. The resulting data may be communicated to an output device, such as an access control panel, access control locking device, parking gate, display, printer, or storage device, and simultaneously, or alternatively, communicated to a local host proximally located computer or remote host, if a host computer is networked into the RFID system.

An important operating parameter of the reader is the range of the reader when communicating with a transponder. The read range is strongly affected by the strength of the electromagnetic field generated by the reader resonant circuit. To generate a field strength which provides the reader with adequate range, the designer of the reader must properly specify a resonant circuit which is appropriately tuned to a predetermined frequency for the desired application of the RFID system.

Another important operating parameter of the reader is antenna impedance. It is desirable that the impedance of the antenna in the reader of an RFID system be specified to match the impedance of the antenna driver. However, the impedance of the reader antenna is often altered by the characteristics of the operating environment in which the reader resides. Additionally, the impedance of the reader antenna can be disturbed during the antenna or reader fabrication process resulting in a detuned resonant circuit. Further, the transponders may also have unique characteristics that vary based on the type of transponder, the manufacturer of the transponder, etc. or may vary from card to card even if the cards are of a same type.

It is generally possible to tune a reader. However, tuning a reader may be static operation (occur only once) and only account for a fixed and partial set of variables or conditions that affect the reader and/or transponder. Further, current tuning methods have sacrificed maximum potential read range due to singular radio frequency (RF) settings/performance used on all credential types and across all RF modulation schemes. The end result is compromised (e.g., subdued) RF performance across the credential range, which may result in reduced read range and potential RF holes (areas near the reader when a credential cannot be read). Also, current tuning methods do not account or optimize performance across credential types, modulation protocols, for different coupling situations (e.g., distance, mounting environment, coil-to-coil coupling, etc.) between the credential and reader, and other factors.

SUMMARY

It is, therefore, one aspect of the present disclosure to provide a reader for an RFID system that can be tuned dynamically and/or in real time during a coupling event with a transponder. The reader can comprise an antenna assembly, a signal driver, and a controller. The antenna assembly may include a tuning circuit and an antenna coupled to the tuning circuit. The tuning circuit can include registers that may be set to adjust one or more characteristics of the readers. A controller is coupled to the antenna assembly to determine characteristics of the received signal and to set hardware or firmware functions that improve the coupling of the reader and transponder and/or improve the reception of the signal(s) from the transponder.

A joint hardware and firmware solution can change configurations settings dynamically and in real-time (i.e., during the process of reading an RFID credential). The RF receiver can be optimized by setting and configuring various RF register settings in the receiver integrated circuit (IC), such as gain, filter levels, threshold levels, and the like. Due to the flexibility of the receiver IC, the RF register settings can be adjusted real-time by the control firmware. Different RF register settings can optimize RF performance for different credential-to-reader distances, for different credential types, and for different credential modulation protocols. For example, as a credential is brought toward the reader, one set of RF register settings may work best when the credential is on the fringe of detection, whereas a different set of register settings may work best when the credential is touching the face of the reader. These adjustments are an improvement because a singular set of register settings do not work optimally under all operating conditions.

The embodiments herein include a simple algorithm to change dynamically the receiver settings once a card or other credentials are detected. A common problem with credentials is that a credential or card will often read on the fringe of the RF field but not at the reader face. During normal use, contactless credentials can be detected first at the fringe of the operating field. With normal user behavior, the card may then "slowly" approach the face of the reader during a read event. While this read event is happening, the reader and the credential card can send and receive messages between each other. By monitoring the conditioned receive signal and/or applying calibrated heuristics, the reader settings (e.g., gain) can be reduced as the card approaches the face of the reader. This process ensures the maximum gain is set while searching for a new card, and then, the gain can be reduced before clipping the receive signal.

Further, the RF detection circuit can monitor and adjust register settings for specific card-to-reader installations or specific card-to-reader loading and coupling conditions. A change in electrical behavior may be predicable and repeatable, and the combined HW/FW algorithm(s) may sense optimal operational settings for any credential relative to a given reader. The firmware algorithm can modify the RF register settings to tune the reader to the card population or to a specific card. During the operational lifetime of a reader, the reader can dynamically "learn" what settings work best and apply these optimal settings to optimize the customer's experience. This dynamic adjustment is advantageous when readers are used with varying card technologies, the cards are produced by unknown manufactures, and/or the cards have long operational lifetimes.

Further, the adjustments may be based on other factors. For example, the reader may be adjusted by time and/or date. Thus, during the day, the reader may employ a longer operational range, but, at night, the reader may have a shorter range to ensure, for example, that the user is located close enough to the reader that a camera can capture a clear image of the user. Additionally, the reader may dynamically adjust the range based on the frequency of cards being presented, i.e., if detecting multiple cards at the same time or in succession, the reader can reduce the range in an attempt to mitigate the need for anti-collision processes and the cards are read one by one as the cards come into the range of the reader. Also, a command card may be presented to the reader to adjust the range, for example, to short, medium, or long range.

Additionally, it is a known phenomenon that RF read performance may vary over temperature. Contactless readers are sometimes installed outdoors. In some environments (e.g., the Midwest or Northeast of the United States, in Nordic countries, etc.) ambient air temperatures may change more than 100 degrees Fahrenheit in a single year. The reader may periodically or persistently detect environmental changes, for example, temperature, in which the reader operates. The environmental changes may be detected in several ways. For example, the reader may compare the received signal with the normal demodulated envelope of the RF signal. A difference in this envelope can be recognizable in-situ.

The advantages of the reader described herein are numerous. For example, the in-situ mechanism and algorithm for dynamically "autotuning" the reader can adapt to the physical environment, credential type, credential position, credential protocol, and/or any other predictable influence on RF performance and/or on any RF parameter. The reader can improve the read-range performance and better RF performance.

Embodiments include a method for improving performance of a reader in an radio frequency identification (RFID) system, comprising: a reader antenna assembly, of the reader, receiving an initial detection of a transponder; the reader receiving initial information about the transponder; based on the initial information, determining a best configuration for the reader antenna assembly; and based on the best configuration, setting one or more registers that change at least one parameter associated with operation of the reader antenna assembly.

An aspect of the above method further comprises: monitoring a signal associated with the transponder; and based on the monitored signal, determining a second best configuration of the reader antenna assembly.

An aspect of the above method further comprises, based on the second best configuration, adjusting the one or more registers to change the at least one parameter associated with operation of the reader antenna assembly.

An aspect of the above method further comprises reading a credential provided by the transponder.

An aspect of the above method further comprises storing the settings of the one or more registers.

An aspect of the above method includes wherein the initial information includes one of an identifier for the transponder or an indication of a type of transponder.

An aspect of the above method further comprises: based on one of the identifier for the transponder or the indication of the type of transponder, retrieving stored settings determined during a previous connection with the transponder; and providing the stored settings as the best configuration.

An aspect of the above method includes wherein the initial information includes one or more environmental conditions encountered when detecting the transponder.

An aspect of the above method further comprises: based on the one or more environmental conditions, retrieving second stored settings determined during a second previous connection with a second transponder, wherein the second previous connection had one or more similar environmental conditions as the one or more environmental conditions; and providing the second stored settings as the best configuration.

An aspect of the above method includes wherein the at least one parameter is associated with one of a gain, a filter level, a threshold level, capacitance, or an impedance.

Embodiments include a reader comprising: a reader antenna assembly comprising: an antenna; a tuning circuit in communication with the antenna, the tuning circuit operable to change at least one parameter associated with operation of the reader antenna assembly, the tuning circuit comprising: one or more registers, when set, operable to change the at least one parameter; an exciter/reader circuit in communication with the a reader antenna assembly, the exciter/reader circuit comprising: a transponder signal receiver circuit comprising: a monitor operable to: receive the initial detection; receive initial information about the transponder; an adjuster operable to: based on the initial information, determining a best configuration for the reader antenna assembly; a controller in communication with the reader antenna assembly and the exciter/reader circuit, the controller operable to: receive the best configuration for the reader antenna assembly; and based on the best configuration, setting the one or more registers.

An aspect of the above reader include wherein the monitor is further operable to monitor a signal associated with the transponder; wherein the adjuster is further operable to, based on the monitored signal, determine a second best configuration of the reader antenna assembly; and wherein the controller is further operable to, based on the second best configuration, adjust the one or more registers to change the at least one parameter associated with operation of the reader antenna assembly.

An aspect of the above reader include wherein the reader antenna assembly is further operable to read a credential provided by the transponder.

An aspect of the above reader include wherein the adjuster is further operable to store the settings of the one or more registers; wherein the initial information includes one of an identifier for the transponder or an indication of a type of transponder; wherein, based on one of the identifier for the transponder or the indication of the type of transponder, the adjuster operable to: retrieve stored settings determined during a previous connection with the transponder; and provide the stored settings as the best configuration.

An aspect of the above reader include wherein the adjuster is further operable to store the settings of the one or more registers; wherein the initial information includes one or more environmental conditions encountered when detecting the transponder; wherein, based on one or more environmental conditions, the adjuster operable to: retrieve stored settings determined during a second previous connection with a second transponder, wherein the second previous connection had one or more similar environmental conditions as the one or more environmental conditions; and provide the stored settings as the best configuration.

Embodiments include a non-transitory computer readable medium including instructions stored in a memory and read by a processor of a reader, wherein the instructions cause the reader to execute a method comprising: receiving an initial detection of a transponder; receiving initial information about the transponder; based on the initial information, determining a best configuration for a reader antenna assembly; based on the best configuration, setting one or more registers that change at least one parameter associated with operation of the reader antenna assembly; monitoring a signal associated with the transponder; based on the monitored signal, determining a second best configuration of the reader antenna assembly; based on the second best configuration, adjusting the one or more registers to change the at least one parameter associated with operation of the reader antenna assembly; and reading a credential provided by the transponder.

An aspect of the above computer readable medium include further comprising storing the settings of the one or more registers.

An aspect of the above computer readable medium include wherein the initial information includes one of an identifier for the transponder or an indication of a type of transponder; wherein the method further comprises: based on one of the identifier for the transponder or the indication of the type of transponder, retrieving stored settings determined during a previous connection with the transponder; and providing the stored settings as the best configuration.

An aspect of the above computer readable medium include wherein the initial information includes one or more environmental conditions encountered when detecting the transponder; wherein the method further comprises: based on the one or more environmental conditions, retrieving second stored settings determined during a second previous connection with a second transponder, wherein the second previous connection had one or more similar environmental conditions as the one or more environmental conditions; and providing the second stored settings as the best configuration.

An aspect of the above computer readable medium include wherein the at least one parameter is associated with one of a gain, a filter level, a threshold level, capacitance, or an impedance.

In some situations, an error signal may be generated by the reader if the read range is adjusted or falls below a set of minimum threshold. The error signal can provide an alert that may signal a denial of service attempt, in which something that disrupts the field is placed close or on the reader.

Embodiments include a method for improving performance of a connection between a reader and a device providing a credential, comprising: a reader receiving an initial detection of a signal from a mobile device; the reader receiving initial information about the mobile device; based on the initial information, determining if a change from a first to an alternate communication system is needed; if a change to an alternate communication is not needed, the reader reading the credential from the mobile device; if a change to an alternate communication is needed: switching from the first communication system to the alternate communication system; and reading the credential with the alternate communication system.

An aspect of the above method includes wherein the first communication system is the reader antenna assembly.

An aspect of the above method includes wherein the alternate communication system is a BLUETOOTH™ system.

An aspect of the above method includes wherein the mobile device instructs the change.

Embodiments include a method for improving performance of a connection between a reader and a device providing a credential, comprising: a mobile device sending a signal to at least one reader; the mobile device receiving at least one signal from the at least one reader; the mobile device determining if the at least one reader should receive the credential; the mobile device determining if a change from a first to an alternate communication system is needed; if a change to an alternate communication is not needed, the mobile device sending the credential to one of the at least one reader; if a change to an alternate communication is needed: switching from the first communication system to the alternate communication system; and sending the credential to one of the at least one reader with the alternate communication system.

An aspect of the above method includes wherein the first communication system is a NFC module.

An aspect of the above method includes wherein the alternate communication system is a BLUETOOTH™ system.

An aspect of the above method includes wherein the mobile device determines one or more signal strengths of a signal from the at least one reader to determine if the at least one reader should receive the credential.

An aspect of the above method includes wherein the measured signal is from the reader antenna assembly.

An aspect of the above method includes wherein the signal strength indicates whether the reader is close enough to send the credential.

An aspect of the above method includes wherein the mobile device determines that the change is needed to communicate by another protocol.

The term "transponder" can refer to any device that emits an identifying signal in response to an interrogating received signal.

The term "reader" can refer to any device or system that can transmit interrogator signals and/or receive authentication replies from tags.

The term "radio frequency identification (RFID)" can refer to any wireless, non-contact use of radio-frequency electromagnetic fields to transfer data, for the purposes of automatically identifying tags that may be attached to objects, carried by people, or even portable devices carried by people, e.g., a PDA, a tablet, a mobile phone.

The term "credential" can refer to any information, signal, data, etc. that may be provided to control access to information, structures, physical areas, other resources, etc.

The term "tag" or "card," which may be used interchangeably, can refer to any label or device that may receive a signal(s) from a reader and/or send signal(s) to the reader to identify an associated object, person, etc. The tag may be operable to provide a credential to identify the associated object, person, mobile phone, etc. The tag may be attached to or provided by a mobile phone.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" or "machine-readable," which may be used interchangeably, as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Also, while the disclosure is described in terms of exemplary embodiments, it should be appreciated that aspects of the disclosure can be separately claimed. The present disclosure will be further understood from the drawings and the following detailed description. Although this description sets forth specific details, it is understood that certain embodiments of the disclosure may be practiced without these specific details. It is also understood that in some instances, well-known circuits, components and techniques have not been shown in detail in order to avoid obscuring the understanding of the invention The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
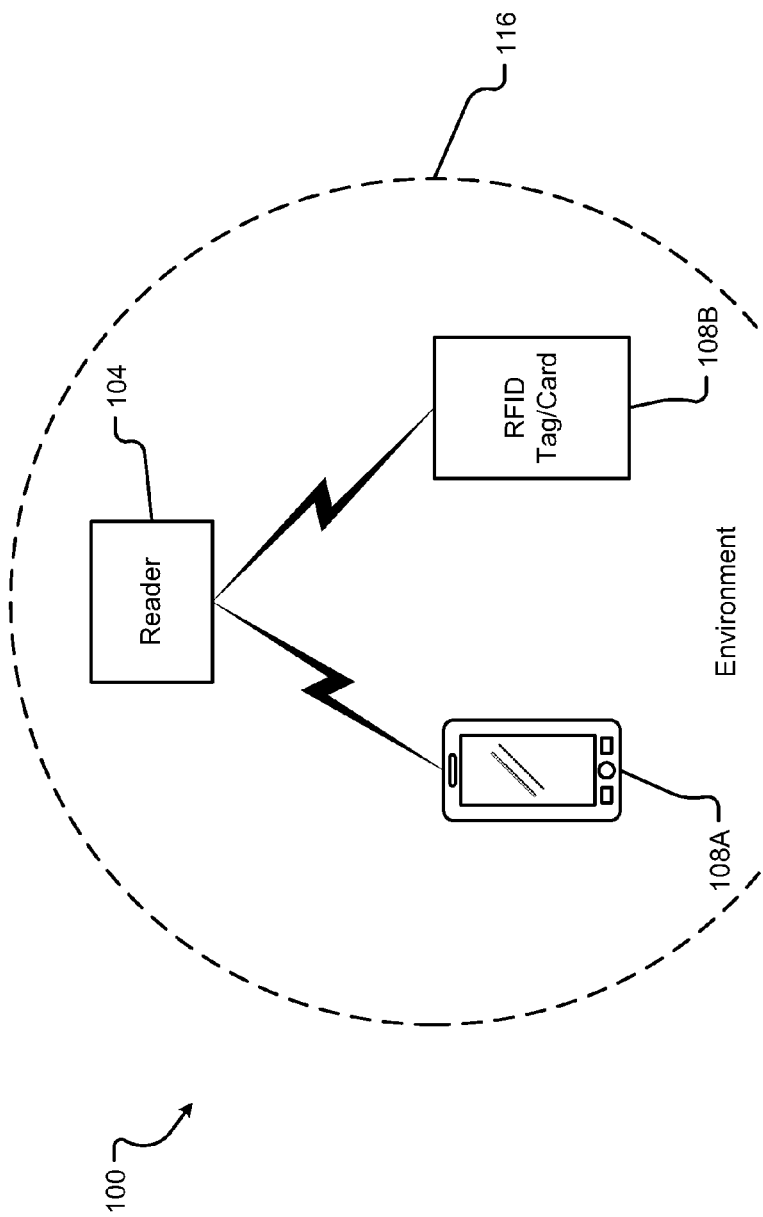
FIG. 1 is a block diagram of an embodiment of an RFID system.

An RFID system 100 is shown in FIG. 1 and generally designated 100. The RFID system 100 comprises a transponder 108 and a reader 104. The transponder 108 can be an active or a passive transponder, which does not require an internal power supply. The electrical power required to operate the passive transponder 108 may be supplied to the transponder 108 by electromagnetic energy transmitted from the reader 104, which can be of a specific frequency and a sufficient strength to power the transponder 108.

Figure 2:
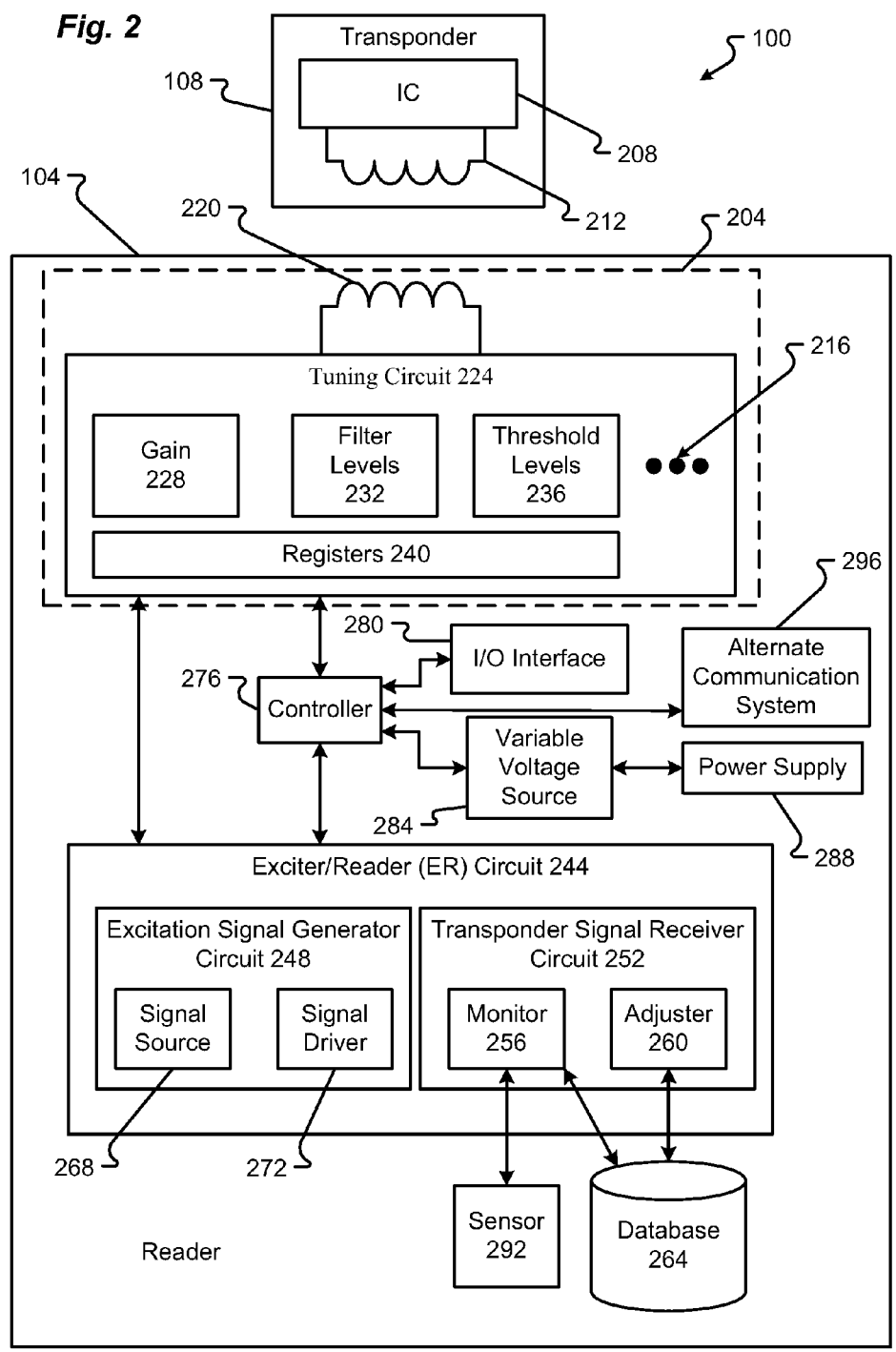
FIG. 2 is a block diagram of an embodiment of a reader in an RFID system that may receive a credential.

As shown in FIG. 2, the transponder 108 may comprise a number of functional elements or modules, which may including one or more of, but is not limited to, a transponder integrated circuit (IC) 208 and a transponder antenna 212. The transponder IC 208 can include the processing and memory capabilities of the transponder 108. The transponder antenna 212 may be coupled to the transponder IC 208 and can include a conventional coil termed a "dual-function antenna," which may perform both the receiving and transmitting functions of the transponder 108. Alternatively, two separate receiving and transmitting antennas can be substituted for the single "dual function antenna" in the transponder 108. The transponder 108 may also include a transponder capacitor (not shown) coupled to the transponder IC 208 and transponder antenna 212. The transponder antenna 212, in cooperation with the transponder capacitor, can define a transponder LC circuit having a tuned resonant frequency, which may correspond to the carrier frequency of the transponder 108.

The transponder 108 shown and described herein is only an example of a type of transponder 108 that may have utility in the RFID system 100. It is understood that practice of the embodiments presented herein is not limited to any specific type of transponder 108, but is generally applicable to other types of transponders. Thus, for example, the transponder 108 can be selected from proximity cards, proximity tags, smart cards, or the like.

The reader 104 can comprise a number of functional elements including one or more of, but not limited to, a reader antenna assembly 204, an exciter/reader (ER) circuit 244, a controller 276, an input/output (I/O) interface 280, and a power supply 288. The power supply 288 can provide electrical operating power to the reader components in a controlled manner. The power supply 288 may be coupled to a finite electrical power source, which is self-contained (i.e., internal) within the reader 104, for example, a portable battery consisting of one or more disposable or rechargeable wet or dry cells. Alternatively, the power supply 288 can be hardwired to an essentially infinite remote electrical power source, such as an electric utility.

The reader antenna assembly 204 can include a tuning circuit 224 and a reader antenna 220. The reader antenna 220 may be a "dual-function antenna," which performs both the receiving and transmitting functions of the reader 104. In particular, the reader antenna 220 can receive transponder data signals from the external environment, encompassed by line 116 in FIG. 1, and/or can transmit excitation signals into the external environment. Although not shown, the reader 104 can include an antenna assembly having two separate receiving and transmitting antennas, respectively, which separately perform the receiving and transmitting functions of the reader 104.

The tuning circuit 224 can include various circuits or modules that may adjust the performance of the reader antenna 220. The tuning circuit 224 can include one or more of, but is not limited to (as represented by the ellipses 216), a gain module 228, a filter levels module 232, and/or a threshold levels module 236. These circuit/modules 228-236 can include variable resistance, variable capacitance, and/or variable inductance elements that can adjust the performance of the antenna 220. The gain module 228 can modify the amount of gain associated with the antenna 220. The filter levels module 232 may adjust the function of one or more filters that filter the received signal. The threshold levels module 236 can effect the level at which a signal is recognized or received. Other modules are possible and contemplated. Each of the modules 228-236 may be electrically coupled to one or more registers 240. The registers 240 may be set to change the function of the modules 228-236. The registers may be subject to control by the controller 276 and/or the transponder signal receiver circuit 252.

The ER circuit 244 may comprise an excitation signal generator circuit 248 and a transponder signal receiver circuit 252. The excitation signal generator circuit 248 can include a signal source 268 and a signal driver 272. The excitation signal generator circuit 248 can function to generate an excitation signal, which the reader antenna assembly 204 transmits in the form of electromagnetic waves into the open space of the operating environment surrounding the reader 104. In particular, the reader 104 can draw electric power from the power source 288 to the signal source 268 when the transponder 108 is proximally positioned relative to the reader 104. The signal source 268 can produce a signal, which is amplified by the signal driver 272, to supply an AC drive signal having a high voltage and high current to the reader antenna assembly 204. The reader antenna assembly 204 then may resonate at a resonant frequency in response to the high voltage/high current AC drive signal, thereby generating excitation signals that are transmitted by the reader antenna assembly 204.

The excitation signals can be received by a transponder 108 in proximity to the reader 104 (i.e., within a read range of the reader 104) to power the transponder 108. Upon activation, the transponder IC 208 generates a transponder data signal, which contains readable credential information (i.e., transponder data) that can be copied or otherwise derived from the memory of the transponder IC 208. The transponder data signal is transmitted into the open space of the external environment surrounding the transponder 108 via the transponder antenna 212. When a transponder data signal is received at the reader antenna assembly 204, the transponder signal receiver circuit 252 performs various operations on the transponder data signal to condition the signal, thereby producing a conditioned signal which is suitable for reading by the reader 104.

The conditioned signal containing the data from the transponder data signal may be conveyed to the controller 276, which processes the conditioned signal to extract the readable transponder data (credential information) contained therein. In particular, the controller 276 can demodulate the conditioned signal in accordance with a respective modulation type according to firmware and/or software executed by the controller 276. The extracted transponder data may be sent to an external device such as a central host computer (not shown) via the I/O interface 280.

As noted above, the excitation signal generator circuit 248 and the transponder signal receiver circuit 252 in combination are termed the ER circuit 244. Skilled artisans can appreciate that the reader 104 can be adapted in accordance with the present invention to include a writer circuit (not shown), which is capable of writing programming instructions or other information to a transponder by either contact or contactless means. The ER circuit and writer circuit in combination are termed an exciter/reader/writer (ERW) circuit.

A monitor 256, included with the transponder signal receiver circuit 252, may monitor the incoming signal from the transponder to determine if any adjustments are necessary. The monitor or monitor module 256 can be any hardware, circuit, firmware, software, etc. operable to complete the functions described herein. Thus, the monitor 256 may monitor signal characteristics, for example, the frequency envelope, clipping of the signal, etc., to determine if the tuning circuit 224 may be adjusted either to eliminate current signal issues or to improve the reception of the signal.

Further, the monitor 256 may preemptively change the tuning circuit 224. A card or transponder 108 may enter the edge of the environment in proximity of the reader 104, as represented by line 116. The reader 104 may either detect this initial contact or may, in some circumstances, receive some initial information about the transponder 108. For example, the monitor 256 may identify the type of transponder 108. From this information or initial contact, the monitor 256 may begin to adjust the transponder 108 to better read the credential when the transponder 108 nears the reader 104. Also, the monitor 256 may determine when multiple transponders are in the environment and may store information for adjusting the reader 104 for a second transponder 108 when a first transponder is being read. This situation may better the experience of the second user. To determine adjustments, the monitor 256 can access a database 264

The database 264 can be any data structure or memory arrangement that can store, manage, and provide data for the monitor. The information stored in the database 264 can be as described in conjunction with FIG. 3. When needed, the database 264 can provide the information to the monitor 264 or an adjuster 260. The information can persist such that the adjuster 260 can make adjustments to the tuning circuit 224 based on past events, such as, past contacts with a transponder 108, past environmental data, etc. By storing the data, the adjuster 260 can acquire and "intelligence" about how to tune the circuit 224.

One or more sensor(s) 292 may provide environmental information to the monitor 256. The sensors 292 can be any electronic sensor that can measure environmental conditions. For example, the sensors 292 can include temperature sensors, hygrometers, pressure sensors, light sensors, magnetic flux sensors, etc. These sensors 292 can provide information to the monitor about the current conditions in the environment 116 that may be provided to the adjuster 260.

An adjuster 260 can be hardware, circuit, firmware, software, etc. operable to complete the functions described herein. The adjuster 260 may execute one or more algorithms for determining adjustments to the tuning circuit 224 based on information provided by the monitor 256. Thus, based on the signal characteristics and/or environmental conditions, the adjuster 260 can change the gain 228, the filter levels 232, the threshold levels 236, etc. by providing changes to the controller 276 to change the registers 240. The adjuster 260 may also directly change the registers 240. As one skilled in the art will understand, the adjuster 260 can make adjustments understood to correct certain observed or anticipated signal issues that are either known to occur or were witnessed previously by the reader 104.

The reader 104 can also include an alternate communication system 296 connected to the controller to support of communications functions or capabilities. As examples, the alternate communication system 296 can comprise a GSM, CDMA, FDMA and/or analog cellular telephony transceiver capable of supporting voice, multimedia and/or data transfers over a cellular network. Alternatively or in addition, the wireless communications module 640 can comprise a Wi-Fi, BLUETOOTH™, BLE, WiMax, Z-Wave, Zigbee, infrared, or other wireless communications link. The wireless communications module 640 can be associated with a shared or a dedicated antenna. The alternate communication system 296 can communicate by a different protocol.

Figure 3:
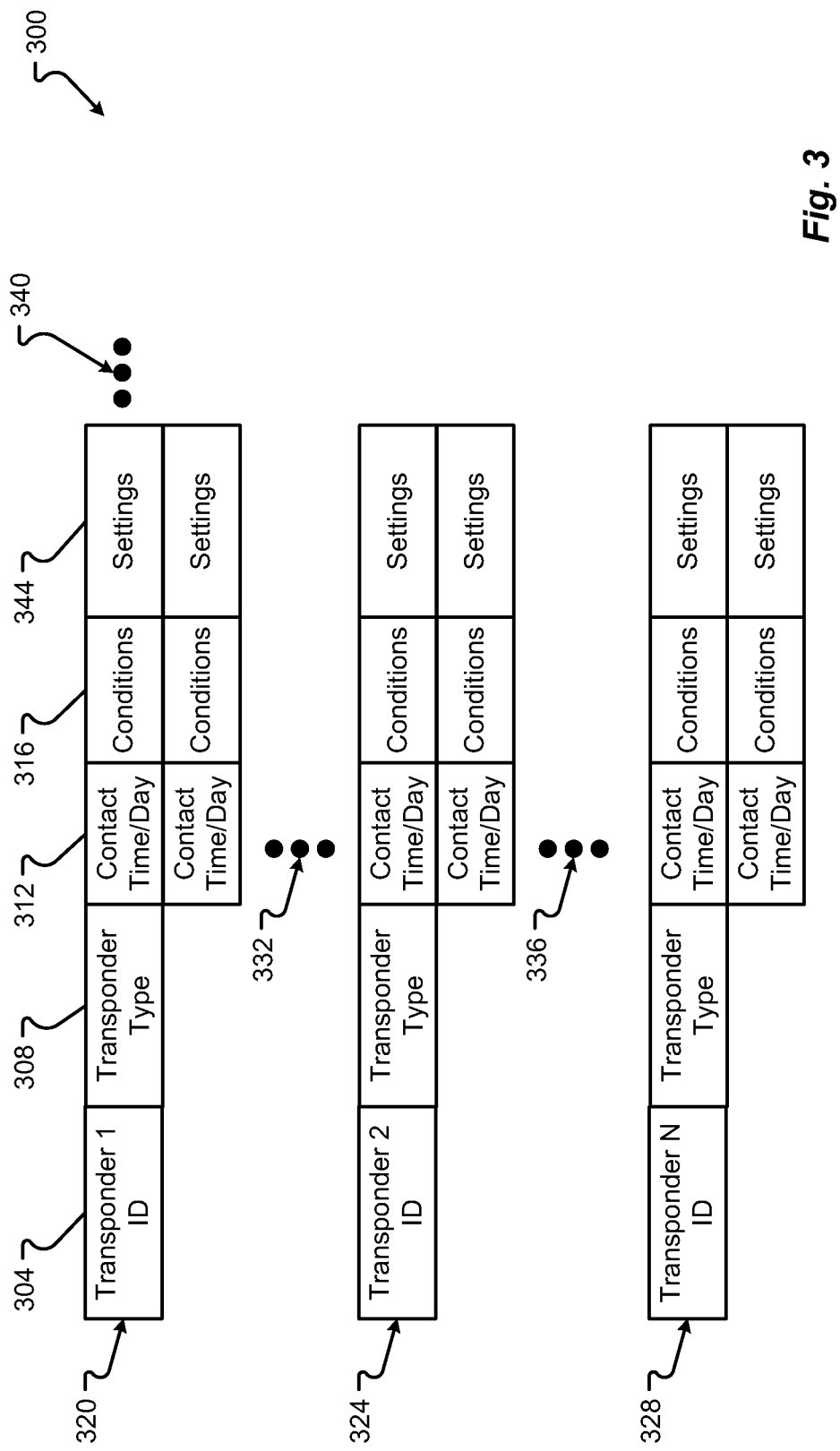
FIG. 3 is a block diagram of an embodiment of a data structure that stores settings information associated with a reader and/or one or more tags/cards.

A data structure 300, which may be the same or similar to the database 264, can include data associated with and stored in response to previous read events and may be as shown in FIG. 3. Here, the data structure 300 can include one or more portions, which may each be associated with a transponder 108 having a transponder identifier 304. Each portion may include different information. The portions of information can include one or more of, but are not limited to, a transponder identifier 304, a transponder type 308, a contact time/day stamp 312, a condition(s) 316, and/or a setting(s) 344. There may be more or fewer portions than those shown in FIG. 3, as represented by ellipses 340.

As provided in FIG. 3, there is data associated with a first transponder 320, a second transponder 324, and for transponder N 328. There may be more or fewer records associated with more or fewer transponders, as represented by ellipses 336. Each transponder 108 can include information about several contact events. Each contact event may include a separate record associated with a contact time/day stamp 312. There may be more or fewer records associated with each transponder 108 than those shown in FIG. 3, as represented by ellipses 332.

A transponder identifier (ID) 304 can be any numeric, alphanumeric, symbolic, etc. identifier. For example, the transponder ID 304 can be a globally unique identifier (GUID) that is associated with only one known transponder. The transponder 108 may provide the ID 304 or the monitor 256 or adjuster 260 may generate the ID 304. Regardless, the ID 304 is associated with only one transponder 108.

The transponder type 308 can be any information that identifies the type of transponder 108. The transponder type 308 can include a manufacturer identifier, a serial number, a model number, a version number, a firmware version number, and/or any other information associated with the transponder 108. Again, the transponder 108 may provide the information or the monitor 256 or adjuster 260 may obtain the information from a controller 276 that may access the information from an external source via the I/O interface 280. The transponder type 308 information can allow the adjuster 260 to modify the tuning circuit 224 for one transponder 108 based on previous contacts with another transponder 108 of the same type.

A contact time/day stamp 312 can be data or an indication that can store information about when a contact event occurred. The stamp may be provided by a clock or other circuit associated with the controller 276. Each noteworthy (a contact event with different settings) may be stored with the transponder record 320, and each record 320 can include a different time/day stamp 312

The conditions data 316 can include any signal characteristics and/or environmental conditions associated with the contact event with the transponder 108. Thus, the conditions data 316 can include any signal issue that was resolved or witnessed. The signal issues can include signal clipping, signal loss, etc. The environmental conditions can include an environmental data determined by the monitor 256 or provide by a sensor 292. Environmental conditions can include a temperature, pressure, humidity, magnetic field information, etc.

Settings 344 can include any change to the registers 240 that may have been made to address the conditions in the condition data 316. Thus, for example, setting 344 can include any decrease in gain, change in the filter levels, change in the threshold level, etc. The settings 344 may be used again if the same or similar conditions are encountered. Thus, the adjuster 260 may not need to make any determination of how to address the conditions but, rather, retrieve a previous collection of setting that addressed the same or similar issue(s) in the past. In this way, the adjuster 260 learns how to respond. Further, the adjuster 260 can preemptively change the registers 240 based on a contact event with a new transponder 108, which is a same or similar type to a transponder 108 previously encountered. In this way, the adjuster 260 learns to apply settings to new situations.

Figure 4:
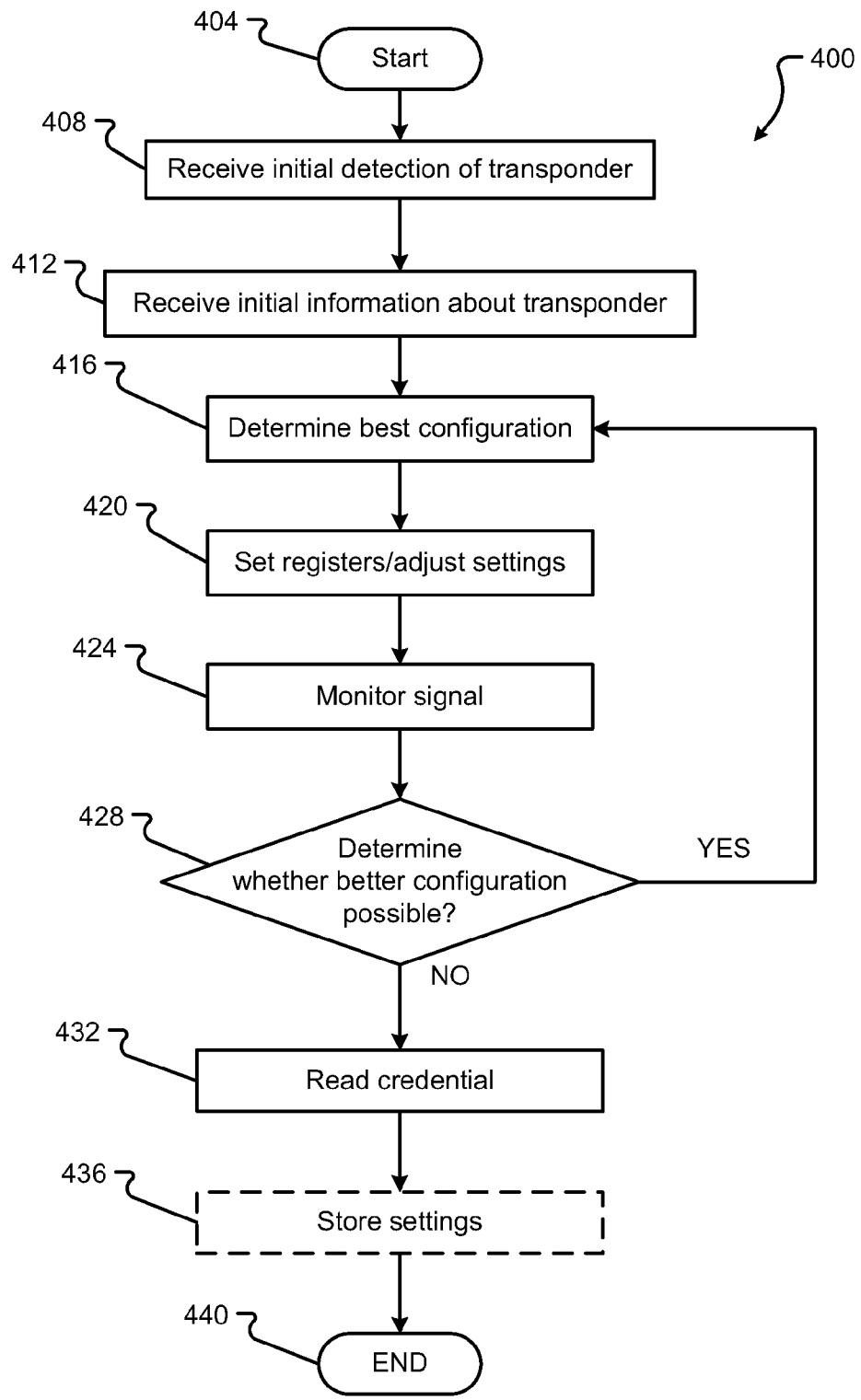
FIG. 4 is a flow diagram depicting an embodiment of a method for auto-tuning a reader in an RFID system.

Methods 400 for automatically tuning the antenna assembly 204 in response to variations in the operating environment of the reader 104, variations in the transponder 108, and/or variations in values of the antenna fabrication parameters (e.g., variations in antenna design tolerances) is described hereafter with reference to FIG. 4. Generally, the method 400 begins with a start operation 404 and terminates with an end operation 440. While a general order for the steps of the method 400 are shown in FIG. 4, the method 400 can include more or fewer steps or arrange the order of the steps differently than those shown in FIG. 4. The method 400 can be executed as a set of computer-executable instructions, firmware, or code, executed by a processor, and encoded or stored on a computer readable medium. Further, the method 400 can be executed by a gate or other hardware device or component in an Application Specific Integrated Circuit, a Field Programmable Gate Array, or other type of hardware device. Hereinafter, the method 400 shall be explained with reference to the systems, components, modules, circuits, firmware, software, data structures, etc. described herein.

A reader 104 receives an initial detection of a transponder 108, having a credential, in step 408. Here, the transponder may enter the operating volume of the reader 104 by crossing boundary 116. The tuning circuit 224 may receive a signal from the transponder 108 that is sent to the monitor 256 of the ER circuit 244. The monitor 256 may then receive initial information about the signal, the transponder 108, and/or the credential, in step 412.

The initial information may be signal characteristics. Additionally or alternatively, the initial information can include an identifier for the transponder 108 or an indication of the type of transponder 108. If an identifier for the transponder 108 or an indication of the type of transponder 108 is received, the monitor 256 may access database 264/300 to determine if the ID 304 may be found or if the transponder type 308 has been encountered. If the ID 304 or type 308 are found in the database 300, the monitor can access settings information 344, which may be passed to the adjuster 260. The adjuster 260 may also receive signal information from the monitor 256.

From the information received, the adjuster 260 can provide information to the controller on a best configuration for the tuning circuit 224. For example, the adjuster 260 may send the settings information 344 to the controller 276. In other situations, the adjuster 260 may determine a best configuration based on the signal or other characteristics provided by the monitor 256.

The controller 276 can the select the preferred settings for the register 240 to control one or more operating parameters of the reader antenna assembly 204, which is correlated to the performance of the one or more modules 228-236 of the tuning circuit 224, in step 420. The settings can be made through a progression of values. The controller 276 may correlate the values of the antenna assembly operating parameters to values of an operating parameter of the reader 104, which can be determined by the controller 276 while ranging the values of the antenna assembly operating parameter. Here, the monitor 256 may continue to monitor the signal, in step 424. Changes to the signal characteristics may be provided to the adjuster 260/controller 276 to continually refine the settings of the reader antenna assembly 204. The controller 276 can the set the value of a antenna assembly operating parameter to that achieves the preferred value using the correlation between the antenna assembly operating parameter and reader operating parameter.

Thus, the controller 276 and/or adjuster 260 can determine if a better configuration may be possible, in step 428. If a better configuration is possible, the method 400 proceeds YES back to step 416 to determine a best configuration. If no better configuration is possible, the method 400 proceeds NO to step 432, where the reader 104 reads the credential from the transponder 108 and ends the contact event. Optionally, the settings that were optimal for the situation of the contact event may then be stored in settings 344 with information about the time/date 312 of the contact and the conditions 316 encountered that required the settings 344.

As an example, the above-recited method is initiated by an initial contact with a transponder 108 and results in the controller 276 generating an initial bias instruction signal. The controller 276 outputs the initial bias instruction signal to the variable voltage source 284 which sets an initial tuning bias signal at an initial (preferably nominal) voltage value in response to the initial bias instruction signal. The variable voltage source 284 outputs the initial tuning bias signal to a variable capacitance circuit. The signal driver 272 of the excitation signal generator circuit 248 outputs an AC drive signal to the reader antenna 220 via the tuning circuit 224, while the controller 276 measures the magnitude of the AC drive signal. It is noted that if the impedances of the reader antenna 220 and signal driver circuit 272 do not match, which is a frequent occurrence, the AC drive signal may be subject to environmental conditions.

In the event of an impedance imbalance between the reader antenna 220 and the signal driver circuit 272, the controller 276 sends additional bias instruction signals to the variable voltage source 284, which directs the variable voltage source 284 to output a series of tuning bias signals in a sequential progression of different voltage values. A preferred progression of voltage values is stepwise between opposite sides of the range of available biasing voltage values. At each different voltage value of the tuning bias signal in the progression, the controller 276 measures or otherwise determines the magnitude of the AC drive signal. The controller 276 plots the resulting values of the magnitude of the AC drive signal versus the voltage values of the tuning bias signals. The controller 276 uses this plot in cooperation with a decision algorithm to select a desired value of the tuning bias signal which corresponds to a point on the plot known to produce a desired impedance match for the reader antenna 220 and signal driver 272. The controller 276 then sets the voltage value of the tuning bias signal output by the variable voltage source 284 to the desired value.

Alternatively or in addition, one of any number of reader operating parameters can be substituted for the AC drive signal magnitude in the above example. Exemplary alternate reader operating parameters include the phase across an inductor in the excitation signal generator circuit 248 or the voltage magnitude on either terminal of the inductor. In any case, the controller 276 determines values of the selected alternate reader operating parameter, plots the resulting values of the alternate parameter values of the tuning settings, and proceeds in substantially the same manner as recited above to select a desired value of the tuning register setting 240, which corresponds to a result desired to maximize or improve performance of the reader antenna 220 and/or the signal driver 272.

Figure 5:
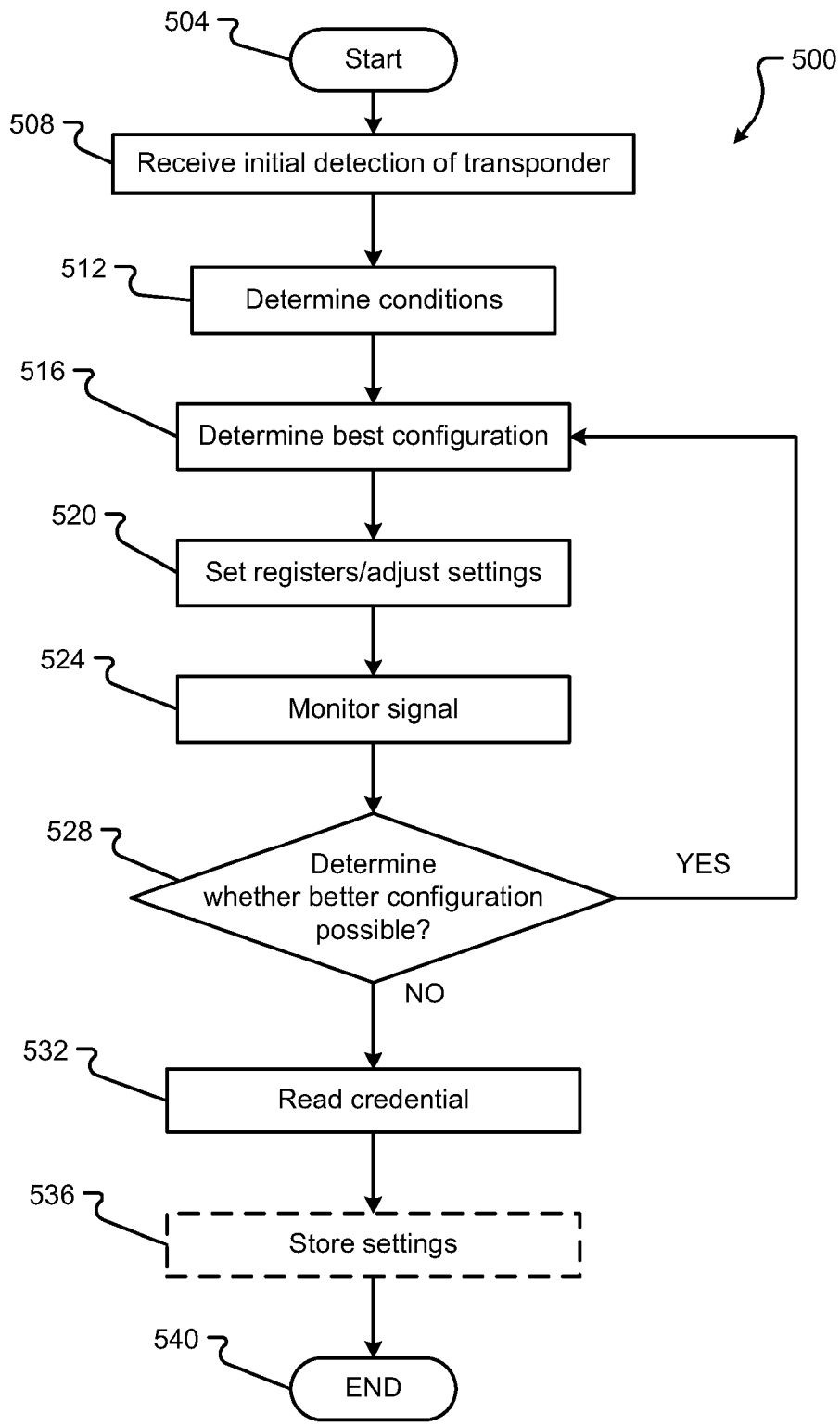
FIG. 5 is another flow diagram depicting an embodiment of a method for auto-tuning a reader in an RFID system.

Method 500, which is similar to method 400 described in conjunction with FIG. 4, is for automatically tuning the antenna assembly 204 in response to variations in the environmental conditions of the reader 104, variations in the transponder 108, and/or variations in values of the antenna fabrication parameters (e.g., variations in antenna design tolerances) is described hereafter with reference to FIG. 5. Generally, the method 500 begins with a start operation 504 and terminates with an end operation 540. While a general order for the steps of the method 500 are shown in FIG. 5, the method 500 can include more or fewer steps or arrange the order of the steps differently than those shown in FIG. 5. The method 500 can be executed as a set of computer-executable instructions, firmware, or code, executed by a processor, and encoded or stored on a computer readable medium. Further, the method 500 can be executed by a gate or other hardware device or component in an Application Specific Integrated Circuit, a Field Programmable Gate Array, or other type of hardware device. Hereinafter, the method 500 shall be explained with reference to the systems, components, modules, circuits, firmware, software, data structures, etc. described herein.

A reader 104 receives an initial detection of a transponder 108, having a credential, in step 508. Here, the transponder may enter the operating volume of the reader 104 by crossing boundary 116. The tuning circuit 224 may receive a signal from the transponder 108 that is sent to the monitor 256 of the ER circuit 244. The monitor 256 may then determine the environmental conditions affecting the signal, the transponder 108, and/or the reader 104, in step 512.

The environmental conditions may be any aspect of the environment, e.g., temperature, humidity, pressure, moisture presence (i.e., it is raining or snowing), magnetic field presence, signal interference, etc. The information about the information may be received from one or more sensors 292. Based on the determined conditions, the monitor 256 or adjuster 260 may access database 264/300 to determine if similar conditions 316 have been encountered. If similar conditions 316 have been encountered, the monitor 256 or adjuster 260 can access settings information 344.

From the information received, the adjuster 260 can provide information to the controller on a best configuration for the tuning circuit 224. For example, the adjuster 260 may send the settings information 344 to the controller 276. In other situations, the adjuster 260 may determine a best configuration based on the conditions, signal characteristics, and/or other characteristics provided by the monitor 256.

The controller 276 can the select the preferred settings for the register 240 to control one or more operating parameters of the reader antenna assembly 204, which is correlated to the performance of the one or more modules 228-236 of the tuning circuit 224, in step 520. The settings can be made through a progression of values. The controller 276 may correlate the values of the antenna assembly operating parameters to values of an operating parameter of the reader 104, which can be determined by the controller 276 while ranging the values of the antenna assembly operating parameter. Here, the monitor 256 may continue to monitor the signal, in step 524. Changes to the signal characteristics may be provided to the adjuster 260/controller 276 to continually refine the settings of the reader antenna assembly 204. The controller 276 can the set the value of a antenna assembly operating parameter to that achieves the preferred value using the correlation between the antenna assembly operating parameter and reader operating parameter.

Thus, the controller 276 and/or adjuster 260 can determine if a better configuration may be possible, in step 528. If a better configuration is possible, the method 500 proceeds YES back to step 516 to determine a best configuration. If no better configuration is possible, the method 500 proceeds NO to step 532, where the reader 104 reads the credential from the transponder 108 and ends the contact event. Optionally, the settings that were optimal for the situation of the contact event may then be stored in settings 344 with information about the time/date 312 of the contact and the conditions 316 encountered that required the settings 344. It should be noted that the information discussed in conjunction with FIG. 4 may be complementary and used in conjunction with the environmental conditions to determine a best operating configuration for the reader antenna assembly 204 based on all the known or determined information.

Figure 6:
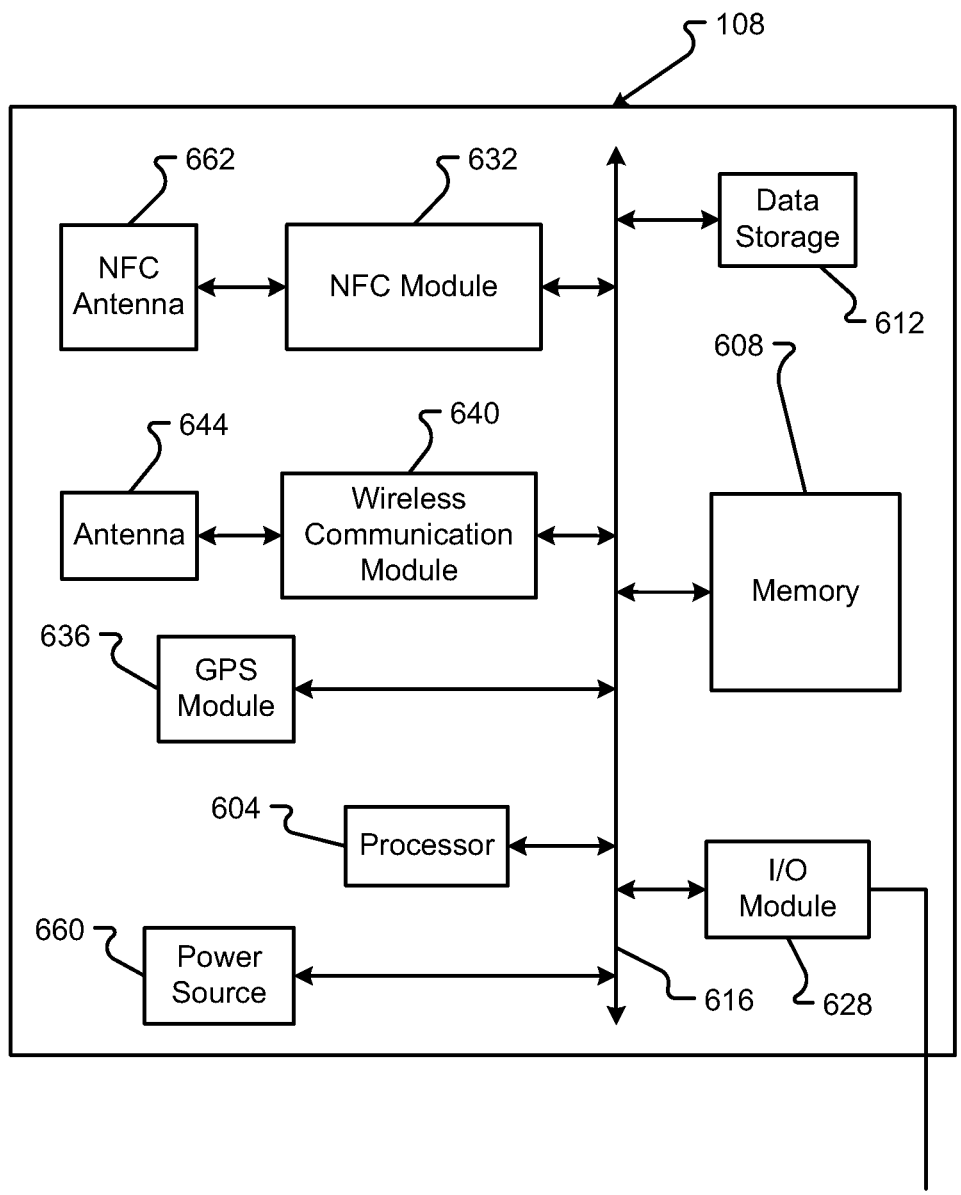
FIG. 6 is a block diagram of an embodiment of a mobile device that may send a credential.

FIG. 6 illustrates components of a mobile device 108. In general, the mobile device 108 may comprise one or more of a processor 604, a memory 608, a data storage 612, a NFC module 632, a NFC antenna 662, an image capture interfaces/devices, and a power source 660. Some configurations of the mobile device 108 may additionally include a Global Positioning System ("GPS"), or equivalent geographical location module, 636, a wireless communication module 640, an antenna 644, an Input/Output ("I/O") module 628, and more. In some cases, the mobile device 108 may comprise various NFC components that form an NFC transceiver (e.g., a NFC antenna 662, a NFC module 632, a power source 660, and/or a processor 604 etc.).

The processor 604 may comprise a general purpose programmable processor or controller for executing application programming or instructions. The processor 604 may include multiple processor cores, and/or implement multiple virtual processors. Additionally or alternatively, the processor 604 may include multiple physical processors. In an example, the processor 604 may comprise a specially configured application specific integrated circuit (ASIC) or other integrated circuit, a digital signal processor, a controller, a hardwired electronic or logic circuit, a programmable logic device or gate array, a special purpose computer, or the like. The processor 604 generally functions to execute computer-readable programming code or instructions, which may be stored in memory 608, implementing various functions of the mobile device 108.

A mobile device 108 may also include memory 608 for use in connection with the execution of application programming or instructions by the processor 604, and for the temporary or long term storage of program instructions and/or data. As examples, the memory 608 may comprise RAM, DRAM, SDRAM, or other solid state memory. Alternatively or in addition, data storage 612 may be provided. Like the memory 608, the data storage 612 may comprise a solid state memory device or devices. Alternatively or in addition, the data storage 612 may comprise a hard disk drive or other random access memory.

The mobile device 108 may include at least one NFC chip, or module, 632 and at least one associated NFC antenna 662. As can be appreciated, the NFC chip/module 632 may comprise one or more of the NFC antenna 662 and at least one secure element. The NFC module 632 may be configured to produce a magnetic field via the NFC antenna 662. This magnetic field produced by the NFC module 632 and antenna 662 may be configured to induce corresponding electrical activity in an NFC tag. In turn, a passive NFC tag may generate its own a radio field, using the power borrowed from the mobile device 108 that may be supplied via the magnetic field. It is an aspect of the present disclosure that the NFC module 632 and NFC antenna 662 may detect and even interpret the radio field (e.g., within the NFC range, 13.56 MHz) produced by the NFC tag. In some cases, the radio field produced by the NFC tag may initiate one or more applications and/or features used by the mobile device 108.

In addition, the NFC module 632 may include security features that may be employed to encrypt, decrypt, and/or store secure information. The NFC module 632 may communicate with other components of the mobile device 108 and/or communication system 100 to prepare and exchange data.

In support of communications functions or capabilities, the mobile device 108 can include a wireless communication module 640. As examples, the wireless communication module 640 can comprise a GSM, CDMA, FDMA and/or analog cellular telephony transceiver capable of supporting voice, multimedia and/or data transfers over a cellular network. Alternatively or in addition, the wireless communications module 640 can comprise a Wi-Fi, BLUETOOTH™, WiMax, infrared, or other wireless communications link. The wireless communications module 640 can be associated with a shared or a dedicated antenna 644.

An I/O module 628 and associated ports may be included to support communications over wired networks or links, for example with other communication devices, server devices, and/or peripheral devices. Examples of I/O include an Ethernet port, a Universal Serial Bus (USB) port, Institute of Electrical and Electronics Engineers (IEEE) 1394, or other interface.

The mobile device 108 can also include a satellite positioning system, or geographical location system, module/receiver 636 such as the Global Positioning System ("GPS") (US), GLONASS (Russia), Galileo positioning system (EU), Compass navigation system (China), and Regional Navigational Satellite System (India). A GPS receiver may further comprise a GPS module 636 that is capable of providing absolute location information to other components of the mobile device 108. A geographical location of the mobile device 108 may be determined by the device's location-based features, a location signal, and/or combinations thereof. The location-based features, and corresponding module 636, may utilize data from one or more satellite positioning systems (e.g., GPS), WiFi access points, cell towers, and the like.

Communications between various components of the mobile device 108 may be carried by one or more buses 616. Moreover, power can be supplied to the components of the mobile device 108 from a power source and/or power control module 660. The power control module 660 may, for example, include a battery, an AC to DC converter, power control logic, and/or ports for interconnecting the mobile device 108 to an external source of power.

Figure 7:
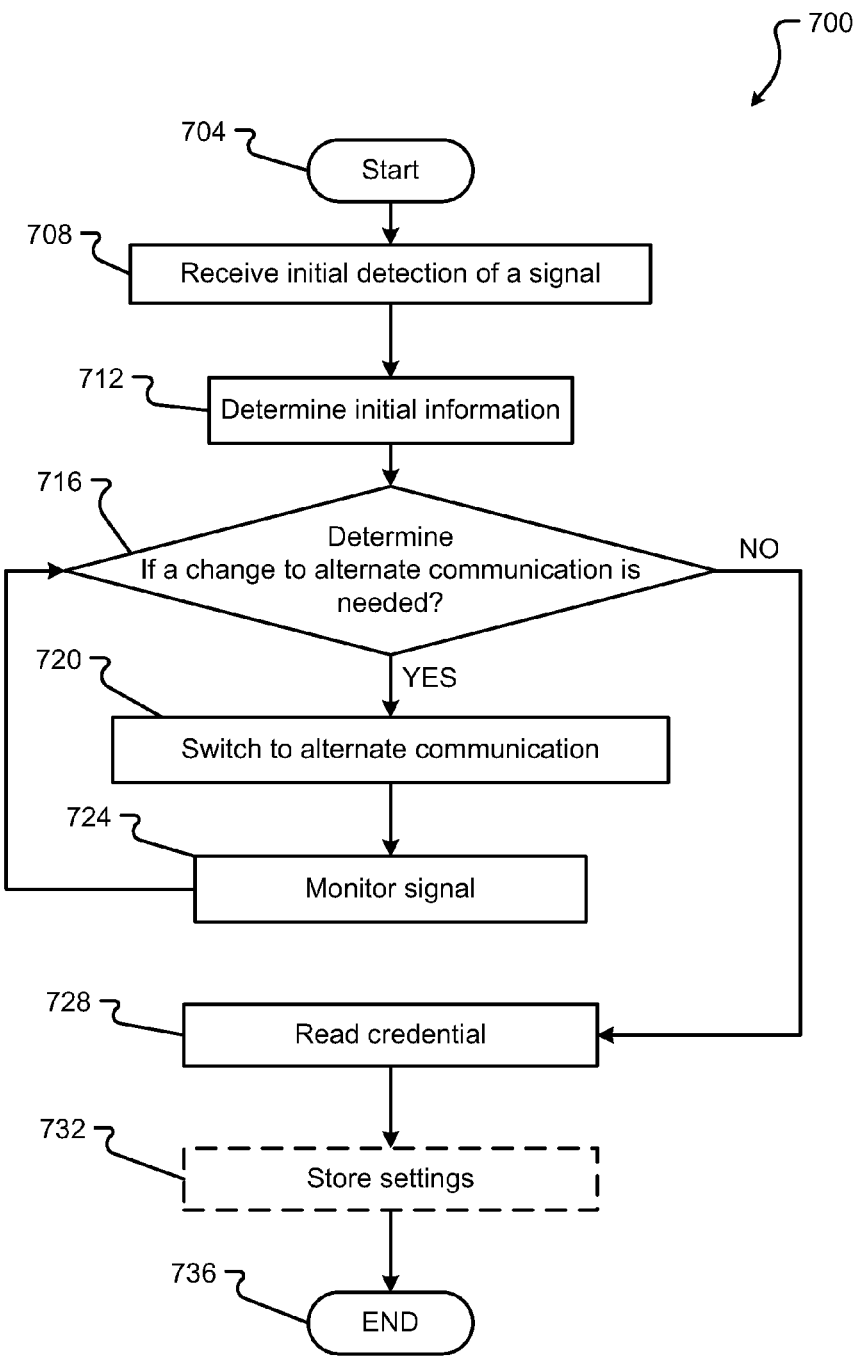
FIG. 7 is a flow diagram depicting an embodiment of a method for tuning a connection between a mobile device and a reader.

Method 700, which is similar to method 400 described in conjunction with FIG. 4, is for automatically tuning the reading capabilities of a reader 104 in response to variations in the conditions of the connection between the reader 104 and a mobile device 108 and is described hereafter with reference to FIG. 7. Generally, the method 700 begins with a start operation 704 and terminates with an end operation 736. While a general order for the steps of the method 700 are shown in FIG. 7, the method 700 can include more or fewer steps or arrange the order of the steps differently than those shown in FIG. 7. The method 700 can be executed as a set of computer-executable instructions, firmware, or code, executed by a processor, and encoded or stored on a computer readable medium. Further, the method 700 can be executed by a gate or other hardware device or component in an Application Specific Integrated Circuit, a Field Programmable Gate Array, or other type of hardware device. Hereinafter, the method 700 shall be explained with reference to the systems, components, modules, circuits, firmware, software, data structures, etc. described herein.

A reader 104 receives an initial detection of a signal from a mobile device 108, having a credential, in step 708. Here, the mobile device 108 may enter the operating volume of the reader 104 by crossing boundary 116. The tuning circuit 224 may receive a signal from the mobile device 108 that is sent to the monitor 256 of the ER circuit 244. In other circumstance, the alternate communication system 296 may receive the initial signal. The monitor 256 may then determine the information or conditions associated with the signal, the mobile device 108, and/or the reader 104, in step 712.

The initial information can include any aspect of the signal received, e.g., whether the signal is a NFC transponder signal, whether the signal is a BLUETOOTH™ signal, whether the signal includes information or signals to establish a BLUETOOTH™ or other connection, etc. The information about the signal may be received from the alternate communication system 296 and/or the reader antenna assembly 204. Based on the received information, the controller 276 to determine if a change to an alternate communication system is needed, in step 716. Here, if the initial connection is made by BLUETOOTH™ or other connection not associated with the reader antenna assembly 204, the controller 276 can determine to switch communications to the alternate communication system 296. In other situations, the mobile device 108 may send a signal to switch to the alternate communication system 296 or to receive signals with the reader antenna assembly 204. Depending on the currently active system (i.e., the reader antenna assembly 204 or the alternate communication system 296) the controller 276 may switch to the other communication system. If a change is needed, the method 700 proceeds YES to step 720 where the controller 276 switches to the other communication system. If no change is needed, the method 700 proceeds NO to step 728. The alternative communication system can communicate by a different protocol.

The monitor 256 may then continue to monitor the signal, in step 724. Changes to the signal characteristics or information provided by the mobile device 108 may require the controller 276 to again switch to an alternate communication system. The method may then proceed to back to step 716 to determine if a switch is needed.

In step 728, the reader 104 or the alternate communication system 296 receives the credential from the mobile device 108 and ends the contact event. Optionally, the settings that were optimal for the mobile device 108 may then be stored in settings 344 with information about the time/date 312 of the contact and the conditions 316 encountered that required the settings 344, in step 732. It should be noted that the information discussed in conjunction with FIGS. 4 and 5 may be complementary and used in conjunction with the communication system change to determine a best operating configuration for the reader antenna assembly 204 and mobile device 108 based on all the known or determined information.

Figure 8:
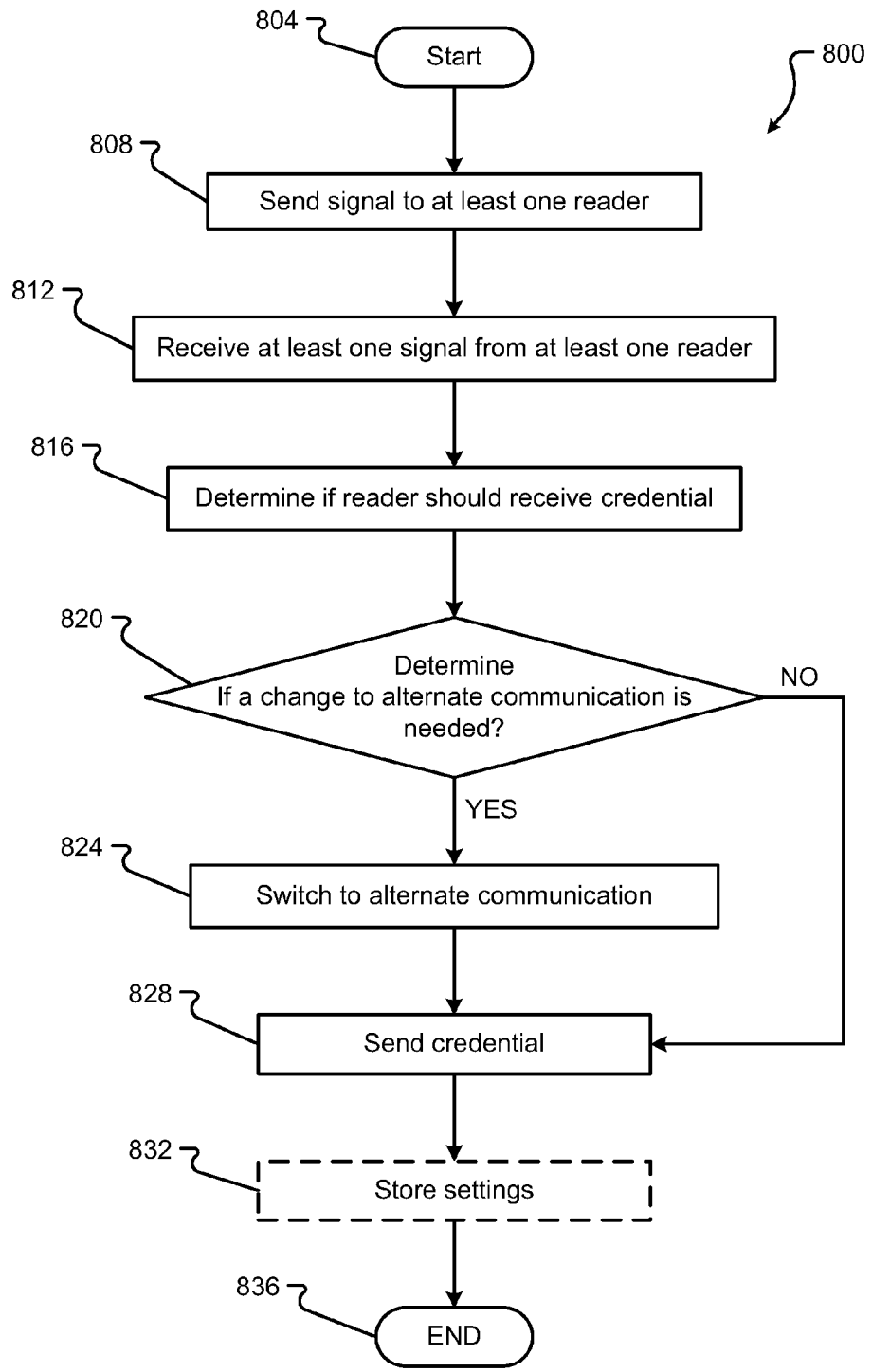
FIG. 8 is another flow diagram depicting an embodiment of a method for tuning a connection between a mobile device and a reader.

Method 800, which is similar to method 400 described in conjunction with FIG. 4, is for tuning the connection between the reader 104 and a mobile device 108 and is described hereafter with reference to FIG. 8. Generally, the method 800 begins with a start operation 804 and terminates with an end operation 836. While a general order for the steps of the method 800 are shown in FIG. 8, the method 800 can include more or fewer steps or arrange the order of the steps differently than those shown in FIG. 8. The method 800 can be executed as a set of computer-executable instructions, firmware, or code, executed by a processor, and encoded or stored on a computer readable medium. Further, the method 800 can be executed by a gate or other hardware device or component in an Application Specific Integrated Circuit, a Field Programmable Gate Array, or other type of hardware device. Hereinafter, the method 800 shall be explained with reference to the systems, components, modules, circuits, firmware, software, data structures, etc. described herein.

A mobile device 108 sends a signal to at least one reader 104, in step 808. Here, the mobile device 108 may enter the operating volume of one or more readers 104 by crossing boundary(ies) 116. The mobile device 108 may receive a signal from the reader(s) 104, in step 812. The mobile device 108 may determine if the reader 104 or which reader 104 should receive the credential associated with the mobile device 104, in step 816.

The mobile device may then determine if a change to an alternate communication system is needed, in step 820. The initial connection may be made through the NFC module 632, the wireless module 640, or other connection. The processor 604 may then determine to switch communications to a different communication system. For example, if the mobile device 108 is receiving signals from two or more readers 104, and the credentials need only be sent to one of the readers 104 by the wireless communication module 640, the mobile device can switch to the NFC module 632 to determine the proximity to the appropriate reader 104 or to identify the appropriate reader 104.

The mobile device 104 may, in one situation, may measure or determine a signal strength of a signal from each of the several readers sending signals to determine if the correct reader is near enough or can be identified to receive the credential. The signal that is measured may be the excitation signal from the reader antenna assembly 204. The signal strength can indicate whether the correct reader is close enough to receive the credential, without interference or without another reader receiving the credential also. The mobile device 104 may also make the change if a new signal protocol is desired.

Once the determination of the correct reader 104 is made, the processor 604 may then switch back to the wireless communication module 640 to transmit the credential. If a change is needed, the method 800 proceeds YES to step 820 where the controller 286 switches to the other communication system. If no change is needed, the method 800 proceeds NO to step 828. The alternative communication system can communicate by a different protocol.

In step 828, the mobile device 104 sends the credential to the reader 104 and ends the contact event. Optionally, the settings that were optimal for the mobile device 108 may then be stored in a memory 608 with information about the time/date of the contact and the conditions encountered that required the settings, in step 832.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the Figures. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method of improving performance of a reader in a radio frequency identification (RFID) system, comprising:
a reader antenna assembly, of the reader, receiving an initial detection of a transponder;
the reader receiving initial information about the transponder;
based on the initial information, determining a best configuration for the reader antenna assembly while the transponder is at least first distance away from the reader;
based on the best configuration and while the transponder is at least the first distance away from the reader, setting one or more registers that change at least one parameter associated with operation of the reader antenna assembly, wherein the one or more registers are integral to a tuning circuit of the reader; and
after the transponder is less than the first distance away from the reader, switching at least one setting of the one or more registers.

2. The method of claim 1, further comprising:
monitoring a signal associated with the transponder; and
based on the monitored signal, determining a second best configuration of the reader antenna assembly.

3. The method of claim 2, further comprising, based on the second best configuration, adjusting the one or more registers to change the at least one parameter associated with operation of the reader antenna assembly.

4. The method of claim 3, further comprising reading a credential provided by the transponder.

5. The method of claim 4, further comprising storing the settings of the one or more registers along with a time at which the one or more registers were set.

6. The method of claim 5, wherein the initial information includes one of an identifier for the transponder or an indication of a type of transponder.

7. The method of claim 6, further comprising:
based on one of the identifier for the transponder or the indication of the type of transponder, retrieving stored settings determined during a previous connection with the transponder; and
providing the stored settings as the best configuration.

8. The method of claim 5, wherein the initial information includes one or more environmental conditions encountered when detecting the transponder.

9. The method of claim 6, further comprising:
based on the one or more environmental conditions, retrieving second stored settings determined during a second previous connection with a second transponder, wherein the second previous connection had one or more similar environmental conditions as the one or more environmental conditions; and
providing the second stored settings as the best configuration.

10. The method of claim 1, wherein the at least one parameter is associated with one of a gain, a filter level, a threshold level, capacitance, or an impedance.

11. A receiver, comprising:
a reader antenna assembly comprising:
an antenna;
a tuning circuit in communication with the antenna, the tuning circuit operable to change at least one parameter associated with operation of the reader antenna assembly, the tuning circuit comprising:
one or more registers, when set, operable to change the at least one parameter;
an exciter/reader circuit in communication with the reader antenna assembly, the exciter/reader circuit comprising:
a transponder signal receiver circuit comprising:
a monitor circuit operable to:
receive the initial detection;
receive initial information about the transponder;
an adjuster operable to:
based on the initial information, determine a best configuration for the reader antenna assembly while the transponder is at least a first distance away from the reader antenna assembly;
a controller in communication with the reader antenna assembly and the exciter/reader circuit, the controller operable to:
receive the best configuration for the reader antenna assembly while the transponder is at least the first distance away from the reader assembly;
based on the best configuration, setting the one or more registers of the tuning circuit as long as the transponder is at least the first distance away; and
after the transponder is less than the first distance away from the reader antenna assembly, switching at least one setting of the one or more registers of the tuning circuit.

12. The receiver of claim 11, wherein the monitor circuit is further operable to monitor a signal associated with the transponder;
    wherein the adjuster is further operable to, based on the monitored signal, determine a second best configuration of the reader antenna assembly; and
    wherein the controller is further operable to, based on the second best configuration, adjust the one or more registers to change the at least one parameter associated with operation of the reader antenna assembly.

13. The receiver of claim 12, wherein the reader antenna assembly is further operable to read a credential provided by the transponder.

14. The receiver of claim 13, wherein the adjuster is further operable to store the settings of the one or more registers;
    wherein the initial information includes one of an identifier for the transponder or an indication of a type of transponder;
    wherein, based on one of the identifier for the transponder or the indication of the type of transponder, the adjuster operable to:
        retrieve stored settings determined during a previous connection with the transponder; and
        provide the stored settings as the best configuration.

15. The receiver of claim 13, wherein the adjuster is further operable to store the settings of the one or more registers;
    wherein the initial information includes one or more environmental conditions encountered when detecting the transponder;
    wherein, based on one or more environmental conditions, the adjuster operable to:
        retrieve stored settings determined during a second previous connection with a second transponder, wherein the second previous connection had one or more similar environmental conditions as the one or more environmental conditions; and
        provide the stored settings as the best configuration.

16. A non-transitory computer readable medium including instructions stored in a memory and read by a processor of a reader, wherein the instructions cause the reader to execute a method comprising:
    receiving an initial detection of a transponder;
    receiving initial information about the transponder;
    based on the initial information, determining a best configuration for a reader antenna assembly while the transponder is at least a first distance away from the reader;
    based on the best configuration and while the transponder is at least the first distance away from the reader, setting one or more registers that change at least one parameter associated with operation of the reader antenna assembly, wherein the one or more registers are included in a tuning circuit of the reader;
    monitoring a signal associated with the transponder and determining that the transponder is less than the first distance away from the reader;
    based on the monitored signal, determining a second best configuration of the reader antenna assembly;
    based on the second best configuration, adjusting the one or more registers of the tuning circuit to change the at least one parameter associated with operation of the reader antenna assembly; and
    reading a credential provided by the transponder.

17. The computer readable medium of claim 16, further comprising storing the settings of the one or more registers.

18. The computer readable medium of claim 17, wherein the initial information includes one of an identifier for the transponder or an indication of a type of transponder;
    wherein the method further comprises:
        based on one of the identifier for the transponder or the indication of the type of transponder, retrieving stored settings determined during a previous connection with the transponder; and
        providing the stored settings as the best configuration.

19. The computer readable medium of claim 18, wherein the initial information includes one or more environmental conditions encountered when detecting the transponder;
    wherein the method further comprises:
        based on the one or more environmental conditions, retrieving second stored settings determined during a second previous connection with a second transponder, wherein the second previous connection had one or more similar environmental conditions as the one or more environmental conditions; and
        providing the second stored settings as the best configuration.

20. The computer readable medium of claim 19, wherein the at least one parameter is associated with one of a gain, a filter level, a threshold level, capacitance, or an impedance.

* * * * *